No. 856,642. PATENTED JUNE 11, 1907.
H. B. JAY.
TUNING SLIDE FOR HORNS AND LIKE INSTRUMENTS.
APPLICATION FILED AUG. 11, 1906.

Witnesses:
Lulu G. Greenfield
Clara E. Braden

Inventor.
Harry B. Jay
By Chappell Earl
Att'ys

THE NORRIS PETERS CO., WASHINGTON, D. C.

UNITED STATES PATENT OFFICE.

HARRY B. JAY, OF KALAMAZOO, MICHIGAN.

TUNING-SLIDE FOR HORNS AND LIKE INSTRUMENTS.

No. 856,642.　　　　Specification of Letters Patent.　　　Patented June 11, 1907.

Application filed August 11, 1906. Serial No. 330,129.

*To all whom it may concern:*

Be it known that I, HARRY B. JAY, a citizen of the United States, residing at Kalamazoo, in the county of Kalamazoo and State of Michigan, have invented certain new and useful Improvements in Tuning-Slides for Horns and Like Instruments, of which the following is a specification.

This invention relates to improvements in tuning slides or crooks for horns.

As tuning slides or crooks for horns have heretofore been arranged, when the slide is drawn out a pocket is formed in the passage, which affects the purity and quality of the tone. This defect is so objectionable that many musicians, particularly those of ability and experience, do not use instruments containing this tuning slide feature.

The main object of this invention is to provide in a horn an improved tuning slide which may be adjusted to any position within its scope without affecting the quality or purity of the tones.

Further objects, and objects relating to structural details, will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this specification, in which—

Figure 1:
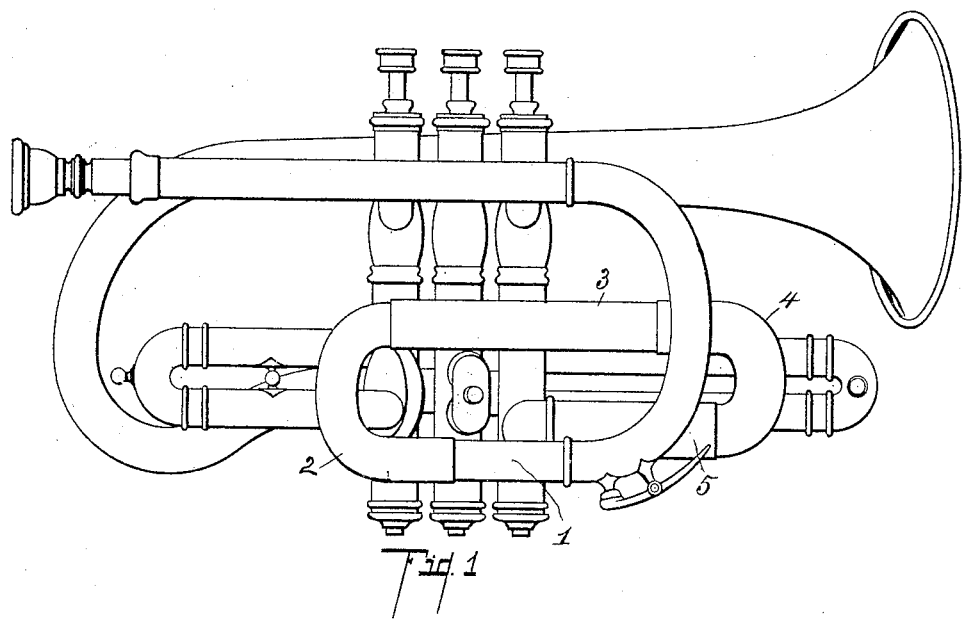
Figure 2:
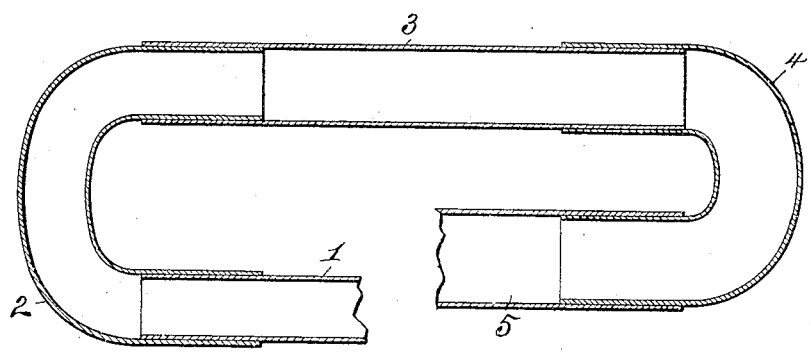
Figure 3:
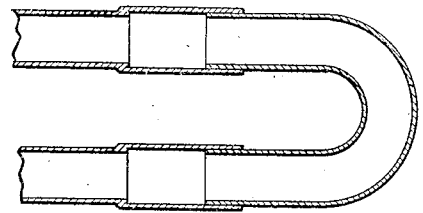

Figure 1 is a side elevation of a cornet embodying the features of my invention. Fig. 2 is an enlarged detail section showing the arrangement of my improved tuning slide. Fig. 3 is a similar view showing the common form of tuning slide in instruments of this class.

In the drawing similar reference characters refer to similar parts throughout the several views.

Referring to the drawing, the instrument illustrated contains two tuning slides or crooks, 2 and 4. These are telescopically arranged with the sections 1, 3 and 5, as clearly appears in Fig. 2. In the preferred form of my invention, as illustrated, the tuning slides are of even diameter from end to end, as are also the coupling sections 1, 3 and 5, with which the slides are telescopically arranged. The sections 1, 3 and 5 are of such diameter relative to the slides that each of the slides telescopes over the section in advance thereof and into the succeeding section. By this arrangement, no matter what the position of the slides may be, no pockets or enlargements with consequent succeeding restrictions are formed. The result is that an even quality and purity of tone is maintained when the slides are adjusted to secure any desired pitch within the scope of the instrument.

By my improvements I secure an instrument having not only a more perfect tone but one having a more perfect scale than those having tuning slides arranged as has been the common practice.

I have illustrated and described my invention as applied to a cornet of the well-known form. It is evident, however, that it is adapted for use in practically any relation where tuning slides are used in instruments of this class.

Having thus described my invention, what I claim as new and desire to secure by Letters Patent, is:

1. The combination with a tuning slide or crook of uniform diameter from end to end, of sections with which said slide is telescopically arranged, said sections being of even diameters from end to end, and of such diameters relative to said slide that it telescopes over the section, in advance thereof and into the succeeding section so that no reductions or pockets are formed by the adjustment of the slide, for the purpose specified.

2. The combination with a tuning slide or crook, of sections with which said slide is telescopically arranged, said sections being of even diameter from end to end, and of such diameter relatively to said slide that it telescopes over the section in advance thereof and into the succeeding section so that no reductions or pockets are formed by the adjustment of the slide, for the purpose specified.

In witness whereof, I have hereunto set my hand and seal in the presence of two witnesses.

HARRY B. JAY. [L. S.]

Witnesses:
　H. B. PARKER,
　CHAS. A. WOLFF.